United States Patent
Hofbeck et al.

(10) Patent No.: US 7,520,529 B2
(45) Date of Patent: *Apr. 21, 2009

(54) SYSTEM AND METHOD FOR DETECTING THE SEAT OCCUPANCY IN A VEHICLE

(75) Inventors: Klaus Hofbeck, Neumarkt (DE); Birgit Rösel, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 334 days.

This patent is subject to a terminal disclaimer.

(21) Appl. No.: 10/536,051

(22) PCT Filed: Oct. 20, 2003

(86) PCT No.: PCT/DE03/03468

§ 371 (c)(1),
(2), (4) Date: May 20, 2005

(87) PCT Pub. No.: WO2004/045915

PCT Pub. Date: Jun. 3, 2004

(65) Prior Publication Data

US 2006/0152347 A1    Jul. 13, 2006

(30) Foreign Application Priority Data

Nov. 20, 2002  (DE) ............................ 102 54 200

(51) Int. Cl.
*B60R 21/015*    (2006.01)
(52) U.S. Cl. .......................... 280/735; 342/72; 701/45
(58) Field of Classification Search ................. 280/735;
701/45; 342/72, 42, 51; 340/825.49, 10.32, 340/457, 457.1, 573.1; 180/287
See application file for complete search history.

(56) References Cited

U.S. PATENT DOCUMENTS 4,888,591 A * 12/1989 Landt et al. ................... 342/44

(Continued)

FOREIGN PATENT DOCUMENTS

DE    198 39 696 A1    3/2000

(Continued)

OTHER PUBLICATIONS

Author not listed: "Entwicklung eines Mikrochips zur Realisierung von Identifikationssystemen" [Development of a Microchip for the Implementation of Identification Systems], FH Aalen Eda-Zentrum, pp. 1-17.
Williamson, Frank, R. et al.: "A Coded Radar Reflector for Remote Identification of Personnel and Vehicles", IEEE, 1993, pp. 186-191.

*Primary Examiner*—Paul N. Dickson
*Assistant Examiner*—Timothy Wilhelm
(74) *Attorney, Agent, or Firm*—Laurence A. Greenberg; Werner H. Stemer; Ralph E. Locher

(57) ABSTRACT

Disclosed is a system for detecting seat occupancy in a vehicle, comprising a microwave transmitter and several reflectors which are provided with a small area and are disposed within a vehicle seat, especially within the backrest of the vehicle seat. A greater or smaller number of reflectors are enabled if a person occupying the seat leans forward, resulting in a jump in intensity each time an additional reflector is enabled. Said jumps in intensity can be used in an advantageous manner for detecting the exact position of the person on the seat. In particular, an airbag can be prevented from deploying and the risks associated therewith can be avoided when the person leans far forward. Alternatively, receivers can be disposed within the seat instead of reflectors.

26 Claims, 5 Drawing Sheets

U.S. PATENT DOCUMENTS

| | | | | |
|---|---|---|---|---|
| 5,164,985 | A * | 11/1992 | Nysen et al. | 380/271 |
| 5,675,342 | A * | 10/1997 | Sharpe | 340/10.2 |
| 5,771,021 | A * | 6/1998 | Veghte et al. | 343/700 MS |
| 5,829,782 | A * | 11/1998 | Breed et al. | 280/735 |
| 5,845,000 | A * | 12/1998 | Breed et al. | 382/100 |
| 6,029,105 | A * | 2/2000 | Schweizer | 701/45 |
| 6,078,854 | A * | 6/2000 | Breed et al. | 701/49 |
| 6,084,530 | A * | 7/2000 | Pidwerbetsky et al. | 340/10.1 |
| 6,199,904 | B1 * | 3/2001 | Dosdall | 280/735 |
| 6,220,627 | B1 * | 4/2001 | Stanley | 280/735 |
| 6,243,012 | B1 * | 6/2001 | Shober et al. | 340/572.7 |
| 6,279,946 | B1 * | 8/2001 | Johnson et al. | 280/735 |
| 6,298,311 | B1 * | 10/2001 | Griffin et al. | 702/150 |
| 6,433,671 | B1 * | 8/2002 | Nysen | 340/10.41 |
| 6,462,701 | B1 * | 10/2002 | Finn | 342/72 |
| 7,026,946 | B2 * | 4/2006 | Saunders et al. | 340/666 |
| 7,090,247 | B2 * | 8/2006 | Hofbeck et al. | 280/735 |
| 2002/0140215 | A1 | 10/2002 | Breed et al. | |

FOREIGN PATENT DOCUMENTS

| | | |
|---|---|---|
| JP | 02116000 A | 4/1990 |
| JP | 05153841 A | 6/1993 |
| JP | 05220054 A | 8/1993 |
| JP | 2001-289940 | 10/2001 |
| JP | 2002-512145 | 4/2002 |
| WO | 99/54173 | 10/1999 |

* cited by examiner

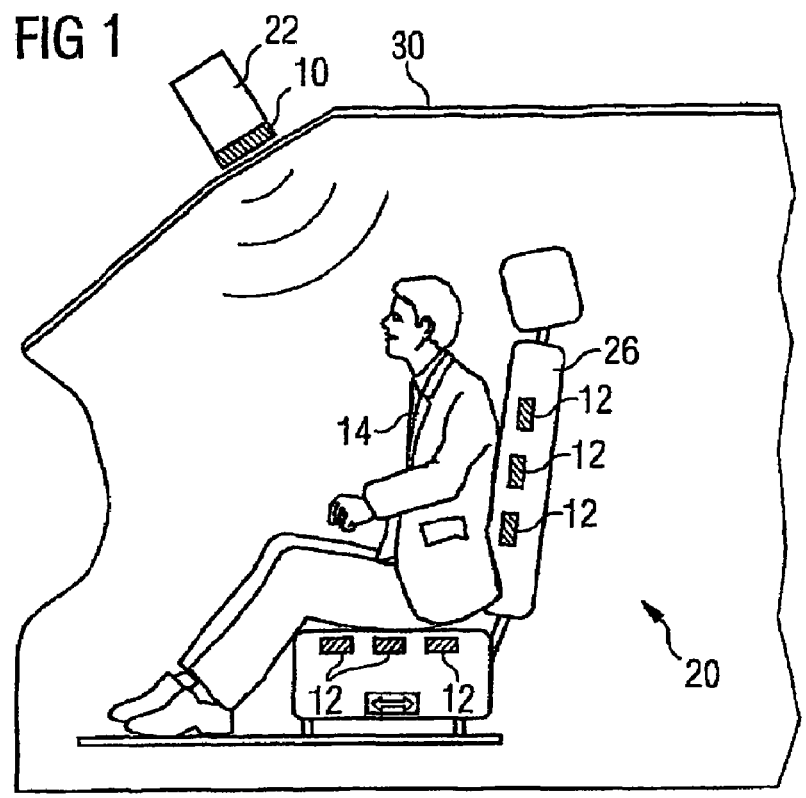
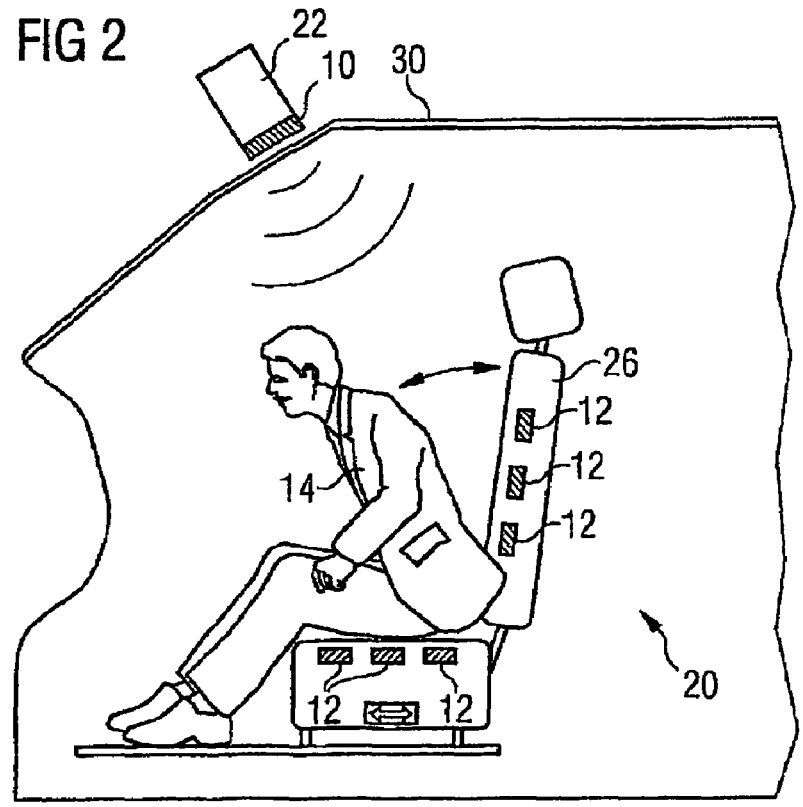

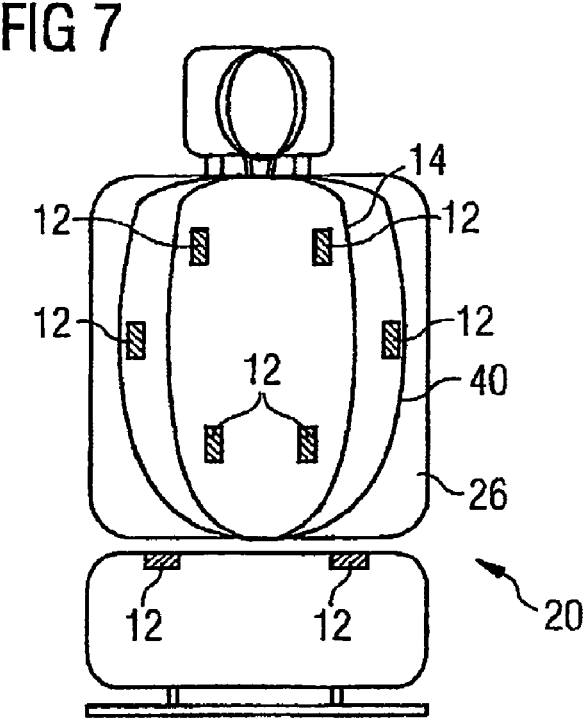
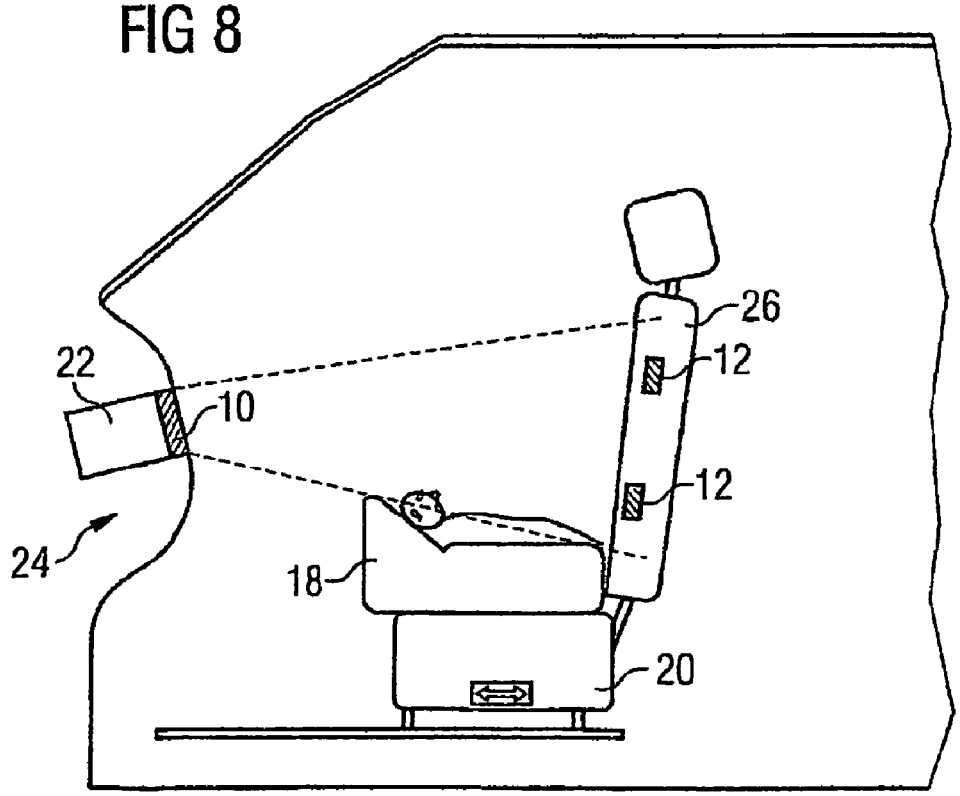

SYSTEM AND METHOD FOR DETECTING THE SEAT OCCUPANCY IN A VEHICLE

BACKGROUND OF THE INVENTION

Field of the Invention

The invention relates to a system for detecting the seat occupancy in a vehicle with at least one microwave transmitter and means for reflecting or receiving the microwave radiation that are arranged within a vehicle seat in which case at least one microwave transmitter and the means for reflecting or receiving are arranged in such a way that the radiation transmitted by the microwave transmitter can at least reach the means for reflecting or receiving in the case of an unoccupied vehicle seat and that depending on the seat occupancy, the means for reflecting or receiving can influence the reflected or received radiation.

The invention also relates to a method for detecting the seat occupancy in a vehicle, with the stages: Transmitting microwave radiation and reflecting or receiving the microwave radiation by using means for reflecting or receiving which are arranged within a vehicle seat in which case the transmitted radiation can at least reach the means for reflecting or receiving in the case of an unoccupied vehicle seat and that depending on the seat occupancy, the means for reflecting or receiving can influence the reflected or received radiation.

Such systems and methods are well-known. In addition to this, they in particular serve to influence the trigger behavior of an airbag depending on the seat occupancy.

An example of such a system and method is well-known from U.S. Pat. No. 6,199,904 B1. In this case, microwaves are transmitted by a microwave transmitter to a reflecting structure in a vehicle seat. The reflecting microwaves are detected by means of a microwave receiver. Because the intensity of the reflected microwaves depends on whether or not the microwave radiation is weakened by a person occupying the seat, the seat occupancy can be determined by the result of the evaluation. However, a disadvantage of this system and method is that airbag control is not always based on reliable evaluations. For example, it can be possible that a reflection takes place from other objects instead of from the reflection objects in the seat provided for this specific purpose. As a result, it was pretended that the seat was not occupied which could result in the airbag being blocked. This could have life-threatening consequences for the passengers of the vehicle. In addition, the calibrations required within the framework of the embodiment are very costly which does not make this system cost-effective in any way. Moreover, all the additional evaluations have to be completed in a computing time which would be opposed to a dynamic measurement and in this case a measurement would then only be made in the case of a vehicle impact. Likewise, in U.S. Pat. No. 6,199,904 B1 no special precautions are taken to detect an out-of-position case which, for example, means a leaning forward of the person. The detection of such an out-of-position case would be desirable because in such situations, the deploying of an airbag should possibly be prevented.

The "detection of the seat occupancy" includes the detection of whether or not a seat is occupied, the detection of the position in which a person is seated on the seat and/or the detection of the build of a person sitting on the seat.

SUMMARY OF THE INVENTION

It is the object of the invention to make available a system and a method which eliminate the disadvantages of the prior art and which, in particular, make possible a reliable detection of the seat position and in this case also the out-of-position case.

This object of the invention is solved by means of the features of the independent claims.

Advantageous embodiments of said invention are specified in the dependent claims.

Therefore, the invention in this way is based on a system of categories in that the means for reflecting or receiving include several elements for reflecting or receiving so that the number of reflecting or receiving elements depend on the seat occupancy. While several elements are provided, a greater or smaller number of those depending on the seat occupancy can be covered or enabled. If a person is sitting properly in the seat, he/she will cover a greater number of elements than if he/she moves out of the proper seat position. Likewise, a distinction can be made between persons with different body volumes because small persons cover a smaller number of elements than persons with greater body volumes. In principle, reflectors or receivers can be arranged within a vehicle seat to implement the system according to the invention. These different technical possibilities are, therefore, summarized under the general term: the means or elements for "reflecting or receiving".

It is particularly useful that several elements for reflecting or receiving are arranged among each other within the backrest of a vehicle seat and/or a headrest of a vehicle. For example, if the microwave transmitter is located in the front area of the motor vehicle in the roof lining, then a maximum number of elements are covered in the case of a person who is sitting properly. If a person occupying the seat leans forward, the elements arranged among each other are enabled in succession so that the received intensity experiences an increase in stages. In this way, switching thresholds from which an airbag should no longer be deployed can, for example, be placed in a slope of the curve in stages so that the switching thresholds precisely conform to a specific incline of the person sitting on the seat of the vehicle.

The system according to the invention is developed further in a particular advantageous way by the fact that the means for reflecting or receiving are non-modulated or modulated backscatter devices and that at least one microwave receiver which can receive the radiation reflected from the backscatter devices is provided. The modulation of the microwave radiation by means of the backscatter devices brings about that the reflector can be distinguished immediately from other metallic conductive objects. For example, if the microwave radiation is reflected by the housing of a laptop on which the front passenger in a motor vehicle is working, then this does not cause the system to take an unoccupied seat as the starting basis. Therefore, an airbag would still be deployed in the case of an impact. Within the framework of this publication, the terms "reflector, reflecting, etc." are used with a very general meaning. This does not only mean reflections in the classical sense of the word, but also for example the retransmission of electromagnetic radiation by means of a modulated backscatter process.

It can be assumed that the backscatter devices are modulating backscatter devices. The reflection can be ascribed unambiguously to a backscatter device by means of the pattern shown by the modulation.

The system according to the invention can be developed further by implementing the backscatter devices as passive, semi-passive, semi-active or active backscatter devices. Passive backscatter devices, in particular, have a very simple structure since they in so far do not require an additional energy supply and they in particular make available a cost-effective solution. Semi-passive backscatter devices are operated with additional amplifiers which in turn do not consume much power. Compared with the passive backscatter devices they have the advantage that a reflection can take place with a higher intensity. On this basis, a more reliable evaluation can be carried out. A reliable evaluation in particular would bring about an active backscatter device, i.e. a backscatter device with active electronic components. As a result of this, the increased microwave intensities, in particular, make possible a reliable evaluation. However, in the case of this embodiment of said invention, the load of the occupants of the vehicle is higher on the basis of the microwave radiation than that in the case of the passive backscatter devices.

In addition, the system can be developed further in a particularly useful way by the fact that the seat occupancy on the basis of the diffraction of the microwaves influences the received intensity and that the received intensity provides information about the seat occupancy. Because microwave radiation, unlike for example infrared radiation, may show clear diffraction at an object arranged in the radiation path because of its wavelength, it is possible to use the changes in intensity on the basis of the diffraction effects. In this way, an empty seat is distinguished from a seat occupied by an adult and, for example, a distinction is also made in the case of a seat occupied by a child and a child seat because in the latter case, because of the increase in height owing to the child seat, the microwave radiation can also be diffracted towards the elements arranged within the seating area of a seat.

It can be provided in a useful manner that the stretch of way covered by the microwave radiation between the microwave transmitter and the microwave receiver or the means for reflecting or receiving can be determined by measuring the running time. Because of this the position of the seat can be determined. As a result, further information about airbag control is provided.

It can be provided in an advantageous way, in particular, that from the result of determining the stretch of way and the result of determining the position of a seat it can be determined whether or not the received radiation was transmitted by the microwave transmitter. In principle, such plausibility considerations are unnecessary if a backscatter device should be used as the reflector, but can also be used in the sense of a redundancy. Of particular use are the considerations on the basis of the running time of the microwave signals, but only if no pattern is imposed on the reflected microwave radiation, for example, by a backscatter process. In this case, an additional evaluation of the position of the seat can determine whether or not the reflection at a reflector can, for example, come from within the backrest of the vehicle seat or whether or not the reflection, for example, comes from a laptop on the lap of a front passenger.

It is advantageous that at least one microwave transmitter and one microwave receiver are used as at least one microwave transmitter device and a microwave receiver device with a transmitter antenna and a receiver antenna. In this way, the microwave radiation arrives from the microwave transmitter device and the microwave receiver device at the reflectors and from the reflectors back to the microwave transmitter device and the microwave receiver device. The microwave transmitter device and the microwave receiver device can, for example, be located within the dashboard of the vehicle or within the roof lining. In the case of such an arrangement of the microwave transmitter device and the microwave receiver device, the changes in the position of persons that have already been described can be detected in a reliable way. Likewise, the discussed differences can be determined between persons with different body volumes. However, it is also possible that a child seat can, for example, safely be transported on the seat of the front passenger. The largest part of the microwave radiation arrives at the reflectors without being adversely affected in any way and then again back from these reflectors to the receiver so that the deploying of an airbag can be prevented because the child seat, in general, consists of a synthetic material and as a matter of principle, raises the child. As further safety measures it is possible to attach a further reflector to the child seat. In this way, microwave radiation is also reflected which would otherwise have been absorbed by the child seat or the child sitting in the child seat. In this way, a deploying of the airbag can still be prevented in a more reliable way. If modulating backscatter devices are used as reflectors, then the backscatter devices within the backrest of the seat or on the child seat can modulate the signals in a different way so that it can be detected in an unambiguous way that there is a child seat on the seat of a vehicle.

It is, in particular, useful that a control unit is provided which triggers, blocks or enables functions in the vehicle depending on the radiation which has been received. Detection of the seat occupancy can also be meaningful together with other functions in the vehicle and the enabling or blocking of an airbag is, however, a particularly important achievement of said invention.

This can also, for example, be embodied in such a way that at least one microwave transmitter and/or at least one microwave receiver form part of an access control and start system installed within the vehicle. In the case of the microwave-based access control and start systems, in particular, the antenna for covering the interior is generally found in such a position that it can also trigger elements arranged within the vehicle seats for reflecting or receiving. As a result, because of the embodiments of this invention in which components of the access control and start system are used to detect the seat occupancy, an integrating and in this way cost-effective measure can be made available.

For reasons of comparison, it can be advantageous that the evaluation of signals received by the microwave receiver can be supported or carried out by the means which are used within the framework of an access control and start system installed within the vehicle.

The system can be embodied in such a way that the radiation path runs in a straight line. If within the said context, a radiation path running in a straight line comes into question, this refers to the scattering of the radiation without diffraction phenomena. In this way, said embodiments refer to the geometrical arrangement of the components. Thus, there is a direct line of sight between the transmitter, the means for reflecting or receiving and/or the receiver. In this way, a simple system is made available, in particular.

However, it can also be useful that the path of the radiation runs by alternate routes. The microwave radiation can be navigated through the vehicle by means of conductive materials fitted in the vehicle, so that a purposeful highlighting of certain zones can be carried out without additional microwave transmitter devices and receiver devices being required.

In a further particularly preferred embodiment of said invention it is provided that several elements for reflecting or receiving during specific time intervals can be selectively activated or deactivated and that by allocating the elements to the time intervals, the elements can be distinguished from one another. In this way, the elements for reflecting or receiving are triggered serially so that unambiguous time slots are allocated to each element. This, in the case of the backscatter devices can, for example, result in the fact that they are supplied with power in the allocated time slots and in this way can reflect the high frequency fields in a modulated way.

Within this context it is particularly useful that the backscatter devices can be modulated with the same frequency. In this way it is possible to structure the transmitter and receiver devices particularly easy in which case nevertheless on the basis of using the modulated, reflected radiation, the complete system functionality is maintained.

However, the backscatter devices can also be modulated with different frequencies. In this way, only on the basis of the modulation frequency is it possible to make a differentiation between the individual reflectors. However, also when different time slots are allocated to different elements, a modulation at different frequencies can be meaningful under these circumstances because in this way the system becomes secure through redundancy.

Therefore, the invention based on a system of categories in that the means for reflecting or receiving include several elements for reflecting or receiving so that the number of reflecting or receiving elements depend on the seat occupancy.

On the basis of the method according to the invention, the advantages and particulars of the system according to the invention are converted. This also applies to the particularly preferred embodiments of the method according to the invention given in greater detail below.

In addition, it is preferred that several elements for reflecting or receiving are arranged among each other within a backrest and/or a headrest of the vehicle seat.

The system is developed further in an advantageous way as a result of the fact that the reflection takes place by means of a modulating backscatter process and that the radiation reflected by the backscatter process is received.

A preferred further development of the method according to the invention provides that the backscatter process is implemented by means of a passive, semipassive, semiactive or an active backscatter device.

In addition, it is also preferred that the seat occupancy influences the received intensity on the basis of the diffraction of the microwaves and that the received intensity provides information about the seat occupancy.

Another preferred further development of the method according to the invention provides that the stretch of way covered by the microwave radiation between the microwave transmitter and the microwave receiver or the means for reflecting or receiving are determined by the running time measurement.

In addition, it is useful that the position of a seat is determined and that from the result of determining the stretch of way and the result of determining the position of a seat it is determined whether or not the received radiation was transmitted by the microwave transmitter.

Further advantages can be obtained if according to the method of the invention provision is made for the triggering, blocking or the enabling functions in the vehicle depending on the radiation which has been received.

In addition it is also deemed advantageous if provision is made for the transmitting and/or receiving to take place on the basis of an access control and start system installed in the vehicle.

Likewise, it is deemed to be useful if it is provided that the evaluation of signals received by the microwave receiver can be supported or carried out by the means which are used within the framework of an access control and start system installed within the vehicle.

As a result, the method according to the invention can be proven to be advantageous because the radiation path runs in a straight line.

Likewise, it can be advantageous that the radiation path runs by alternate routes.

In addition, it is also useful that several elements for reflecting or receiving during specific time intervals are selectively activated or deactivated and that by allocating the elements to the time intervals, the elements are distinguished from one another.

Within this context, it can be provided in a useful way that the backscatter processes which occur at the different elements use the same modulation frequency.

However, the method according to the invention can also be proven to be advantageous by means of the fact that the backscatter processes which occur at the different elements use different modulation frequencies.

The invention is therefore based on the knowledge that a particularly reliable and nevertheless simple and cost-effective seat occupancy detection can be made available while several reflectors which are provided with a small area are arranged within a vehicle seat. This makes possible a distinct separation between a person leaning slightly forward and the so-called out-of-position case; this means the case of which an airbag may on no account be deployed. In the course of a person leaning forward, steep slopes are obtained over and over in the intensity curve, namely, when an additional element within a vehicle seat is reached by the microwave radiation. Of course, the opposite also applies when a person leans backward and this for example means when moving from the out-of-position case to a proper seat position. Within the framework of the system according to the invention, diffraction phenomena of the microwave radiation can be used in an advantageous way which is sufficiently clear, for example, compared with systems operating with infrared radiation. The use of microwave radiation is also advantageous for the reason that, compared with the use of other wave forms, for example, ultrasound, laser radiation or light and infrared radiation, a strong absorption takes place in the human body. Microwave radiation is scattered independently of the pressure, temperature, brightness and other ambient conditions. Because of the simplicity of the evaluation, the measuring method is carried out very quickly so that a dynamic measurement is, for example, only possible in the case of an impact. Further preferences of the invention can be detected by the fact that a seat occupancy can be detected at a very high speed. The time for the detection can, for example, be within the millisecond range. As a result of this, airbag control can be given a dynamism which for example makes it possible, after the airbag has already been deployed, to influence, depending on the seat occupancy or the position/tilt of the person on the seat, the filling of the airbag, preferably by reducing the pressure.

BRIEF DESCRIPTION OF THE DRAWING

Particularly preferred embodiments of the invention are now explained in greater detail on the basis of the accompanying drawings.

They are as follows:

FIG. 1 a preferred embodiment of a system according to the invention with a person in a first seat position;

FIG. 2 the embodiment according to FIG. 1 with a person in a second seat position;

FIG. 7 a vehicle seat to be used in a system according to the invention with the contours of the upper part of the body of persons having different builds;

FIG. 8 the embodiment according to FIG. 4 with a seat occupied by a baby seat;

DESCRIPTION OF THE PREFERRED EMBODIMENTS

Figure 3:
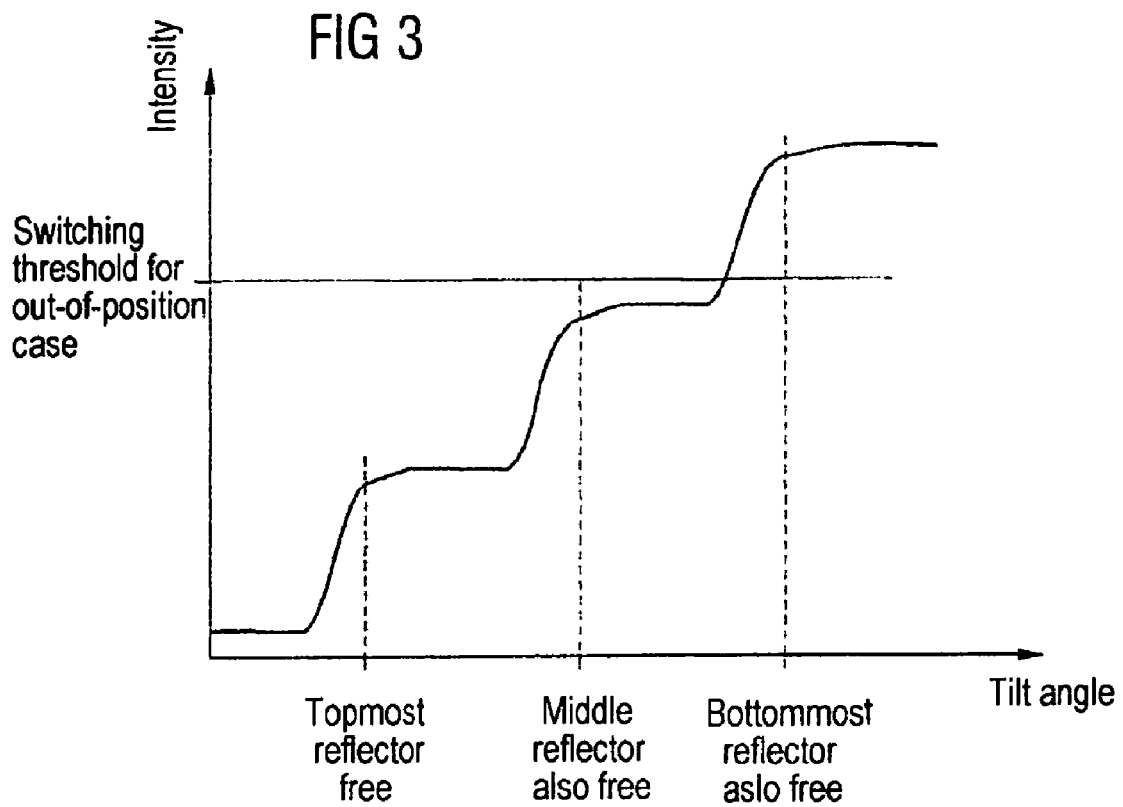
FIG. 3 a diagram explaining the invention.

In the following description of the preferred embodiments of the said invention, the same reference symbols are allocated to the same or comparable components.

FIG. 1 shows a preferred embodiment of a system according to the invention with a person in a first seat position. FIG. 2 shows the embodiment according to FIG. 1 with a person in a second seat position. A microwave transmitter device and a microwave receiver device 10 are arranged in the vicinity of the roof control unit 30 of a vehicle and connected to a control unit 22. Several reflectors 12 are arranged within a vehicle seat 20 which, depending on the embodiment, can be designed as backscatter or as simple electrically conductive foils. The seat 20 can usually be shifted in such a way whereby it is particularly preferred if the position of the seat 20 can be determined.

FIGS. 1 and 2 show a person 14 sitting in different positions on a seat 20. In FIG. 1, the person 14 is sitting properly. In FIG. 2, the person 14 is leaning forward so that there is a clearance between the upper part of the body of the person 14 and the backrest 26 of a seat 20. The position in FIG. 2 can also be designated as the out-of-position case.

Microwave radiation transmitted from the microwave transmitter and the microwave receiver device 10 can now depending on the seat position reach a greater or a smaller number of reflectors 12 and as a result particularly reflectors 12 arranged in a greater or smaller number in the backrest 26 of a seat 20. Accordingly, the intensity reflected by the reflectors 12 and the intensity received by the microwave transmitter device and the microwave receiver device 10 therefore depend on the seat position of the person 14.

In addition to the evaluation of the reflectors in the backrest of a seat or the headrest of a seat, it is also particularly useful to evaluate the sensors in a seating area of a seat because on this basis it is possible to detect the seat occupancy and, in particular, also situations which can be designated as the out-of-position case.

FIG. 3 is a diagram explaining the invention. The shown intensity curve depending on the tilt angle of the person 14 shown in FIGS. 1 and 2 results from the successive enabling of the different reflectors 12 in the backrest of a seat 26. If the person 14, departing from the position shown in FIG. 1, leans forward then the topmost reflector will first of all be enabled which results in a slope in the intensity curve. If the person 14 leans farther forward, then the relations do not change or hardly change at all. Only when the next reflector 12, i.e. the middle reflector 12, within the backrest of a seat 26 is enabled, will the next slope in the intensity curve occur. The same happens when the bottommost reflector 12 is enabled. If the arrangement of the reflectors 12 and the switching threshold are selected in a coordinated way for the out-of-position case, then the switching threshold can, for example, be placed in a slope of the intensity curve as can be seen in FIG. 3. In this way, a tilt angle without a wide fluctuation range can be defined in which case the presence of the out-of-position case is assumed.

It is particularly useful if the different reflectors can be distinguished from one another. This concerns both the reflectors arranged in a vehicle seat and the reflectors which can be arranged in the different seats of a vehicle within a vehicle or in other positions within the vehicle. It is particularly useful to use backscatter devices as reflectors, said backscatter devices being activated at different time intervals. This activation, may for example take place by supplying a current to the specific backscatter device while the backscatter device is deactivated in the currentless state. If the active time intervals are now unambiguously allocated to the backscatter devices, then the individual backscatter devices can be detected unambiguously via this allocation. Therefore, it is possible to work with narrow band microwave radiation because a differentiation between the different backscatter devices via different modulation frequencies is not required. Via such a modulation with different frequencies, it is possible to make a distinction between the backscatter devices, but also alternatively or in addition to making a distinction via the time intervals.

Figure 4:
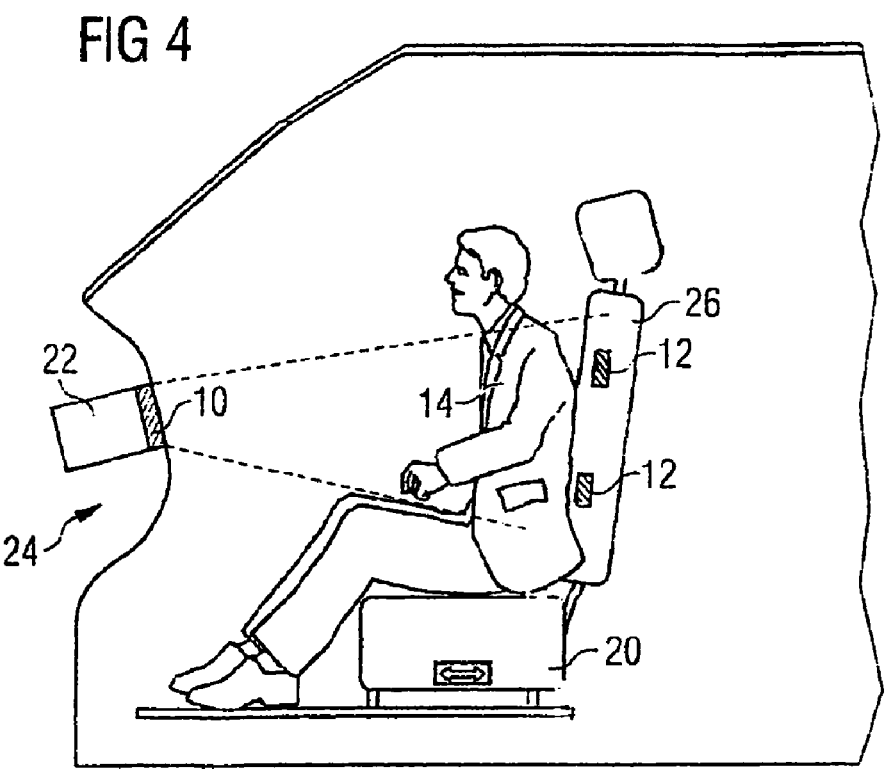
FIG. 4 a further embodiment of the system according to the invention with a person in a first seat position.
Figure 5:
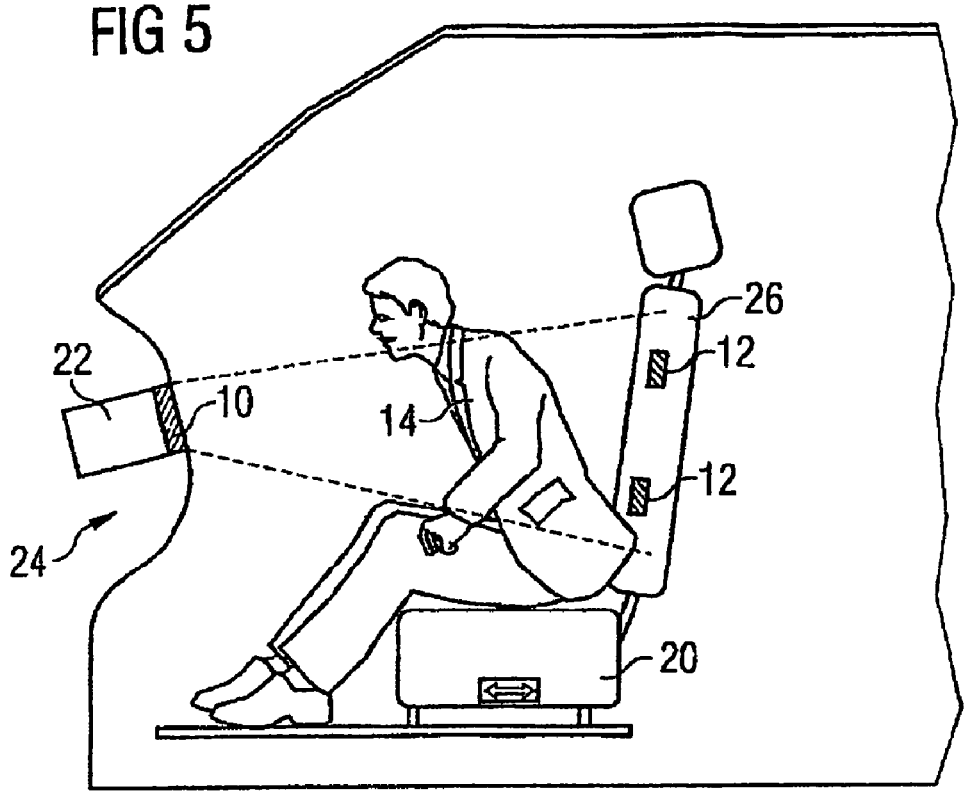
FIG. 5 the embodiment according to FIG. 4 with a person in a second seat position.

FIG. 4 shows a further embodiment of the system according to the invention with a person in a first seat position. FIG. 5 shows the embodiment according to FIG. 4 with a person in a second seat position. In the case of the system shown here, the reflectors 12 are only arranged within the backrest 26 of a seat 20 and this actually means not in the seating area which is contrary to the views according to FIGS. 1 and 2. It is in many cases sufficient to detect the out-of-position case shown in FIG. 5. As a further difference to FIGS. 1 and 2, in the case of the systems according to FIGS. 4 and 5, the microwave transmitter device and the microwave receiver device 10 and the allocated control unit 22 are arranged in the cockpit 24 of the vehicle. Also in this case, the reflectors 12 are enabled in succession when a person 12 leans forward. In the case of this arrangement, diffraction phenomena of the microwaves play an important role because in the case of the view according to FIG. 3, the direct line of sight between the reflectors 12 and the microwave transmitter device and the microwave receiver device 10 still does not exist or only exists partially. However, because of the diffraction effects, the microwaves nevertheless arrive from the microwave transmitter device and the microwave receiver device 10 at the reflectors 12 and vice versa from the reflectors 12 at the microwave transmitter device and the microwave receiver device 10.

Figure 6:
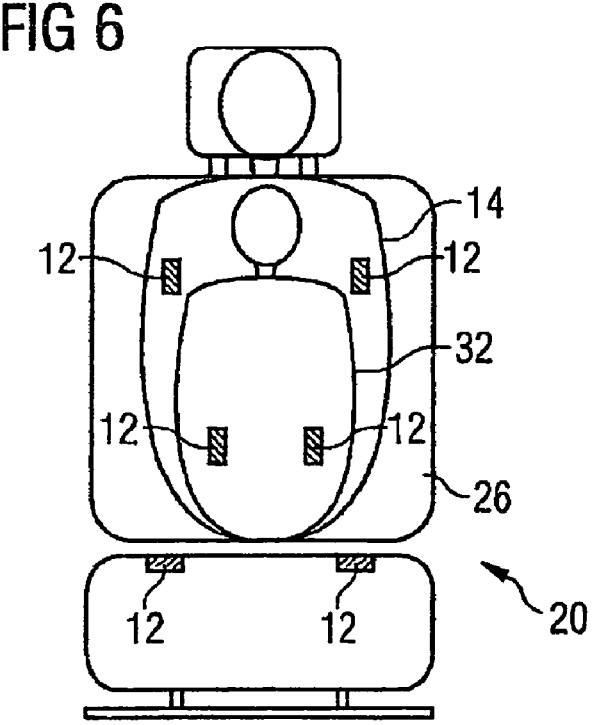
FIG. 6 a vehicle seat to be used in a system according to the invention with the contours of the upper part of the body of two persons of different heights.

FIG. 6 shows a vehicle seat to be used in a system according to the invention with the contours of the upper part of the body of two persons of different heights. Here, a further example of an application is given in the case of which the advantages of using reflectors 12 with a small area within a vehicle seat 20 or in particular within the backrest of a vehicle seat 26 are illustrated. The reflectors 12 are arranged in the form of an array. A tall person 14 covers all the reflectors 12 arranged in the backrest 26 of a vehicle, whereas a short person 32 for example a child, only covers the bottom reflectors 12. Therefore, by means of this system an unambiguous distinction can be made between tall and short persons especially as not only a gradual difference in the reflected intensities will be determined, but a difference in leaps on the basis of the complete enabling of the top reflectors 12 which have small areas if a short person 32 moves on the seat.

FIG. 7 shows a vehicle seat to be used in a system according to the invention with the contours of the upper part of the body of persons having different builds. A person 40 with a large body volume and a person 14 with a small body volume are shown. In the case of a suitable arrangement of the reflectors 12 within the backrest 26 of a vehicle seat 20, all the reflectors 12 can be covered by the person 40 with a larger body volume whereas the outer reflectors 12 are enabled by the thinner person 14.

FIG. 8 shows the embodiment according to FIG. 4 with a baby seat occupying a vehicle seat. Here there is a baby in a child seat, in this case in a so-called reboard seat 18. This seat is fastened properly to the passenger seat 20. On the basis of the relative positions of the microwave transmitter device and the microwave receiver device 10, the reflectors 12 and the reboard seat 18 there is only a limited attenuation of the microwave radiation. Therefore, a deploying of the airbag is prevented. In addition, it is possible that under certain circumstances and even very meaningful to fasten reflectors to the back of the reboard seat 18. Therefore, for example, in the case of a special modulation of the microwave radiation by reflectors, because of a running time measurement or by allocating different time slots to the individual reflectors, the situation with a child seat 18 on the seat 22 can be distinguished from the situation without an object on a seat 20. If for example in the case of the system according to the invention, the reflectors 12 are obscured by a metallic object, this results in a strong reflection. The intensity of this reflection can possibly for example be in the same order of magnitude as the intensity of the reflection by the reflectors 12. There are now different possibilities for the control unit 22 to detect the different situations. If the reflectors are backscatter devices with an unambiguous coding, whether through the modulation frequency or the time slots, the reflection is on this basis unambiguously detected by the obscuring metallic object. Alternatively or additionally, the reflection can be detected by a shadowing, metallic object on the basis of a running time measurement, particularly if the running time is compared with the actual seat position which can be determined by an additional sensor.

Likewise, it is advantageous that objects without or with slight electrical conductivity in front of the reflectors 12, only slightly obscure the reflectors 12. Therefore, the signals received from the control unit conform to the situation "empty seat" so that a deploying of the airbag is blocked in the correct way.

Figure 9:
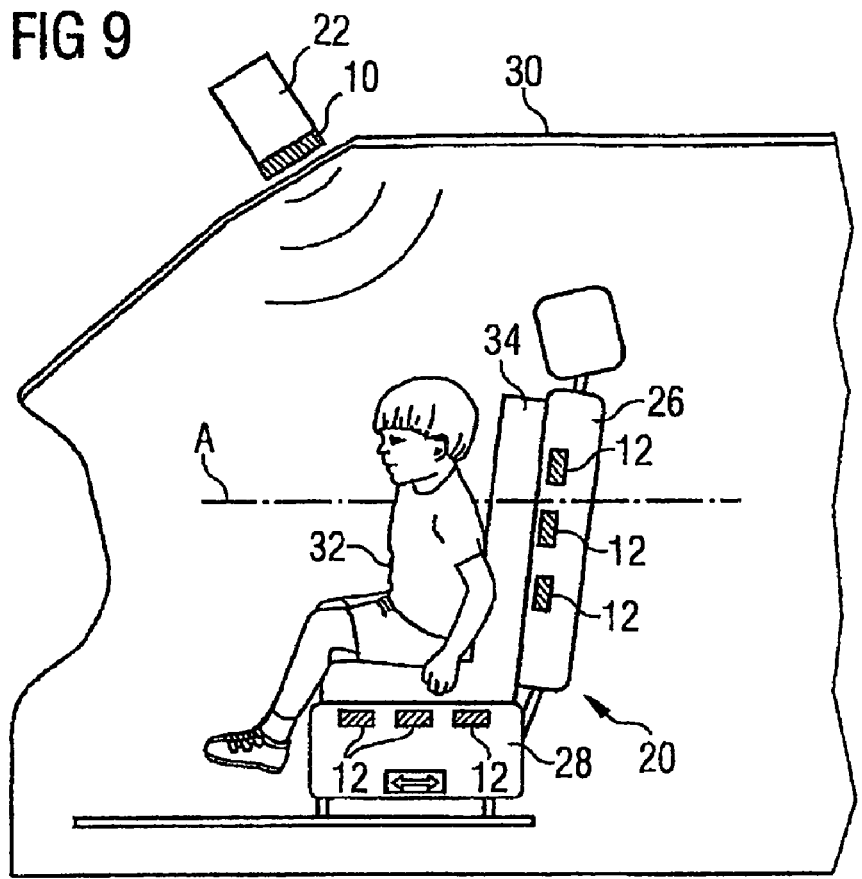
FIG. 9 the embodiment according to FIG. 1 with a seat occupied by a child seat.

FIG. 9 shows the embodiment according to FIG. 1 with a child seat occupying a vehicle seat. On the basis of the system according to the invention, the situation shown here can also be distinguished from a person leaning forward. A child 32 sits on a child seat 34 which is arranged on a seat 20. Several reflectors are arranged both in the seating area 28 of the seat 20 and in the backrest 26 of a seat 20. On the basis of a child seat 34 which in general absorbs the microwaves to a much lower extent than the body of a child 32, it is possible, particularly on the basis of diffraction phenomena, for microwaves to find their path between the microwave transmitter device and the microwave receiver device 10 and the reflectors 12 within the backrest 26 or the seating area 28 of a seat. Therefore, the reflectors 12 within the seating area 28 receive a higher intensity than they could receive if an adult person were sitting directly on the seating area 28 of the seat.

In this way, by means of a suitable arrangement of several reflectors 12 and a corresponding suitable arrangement of the microwave transmitter device and the microwave receiver device 10, different situations with a view to the seat occupancy in the vehicle can be detected.

Figure 10:
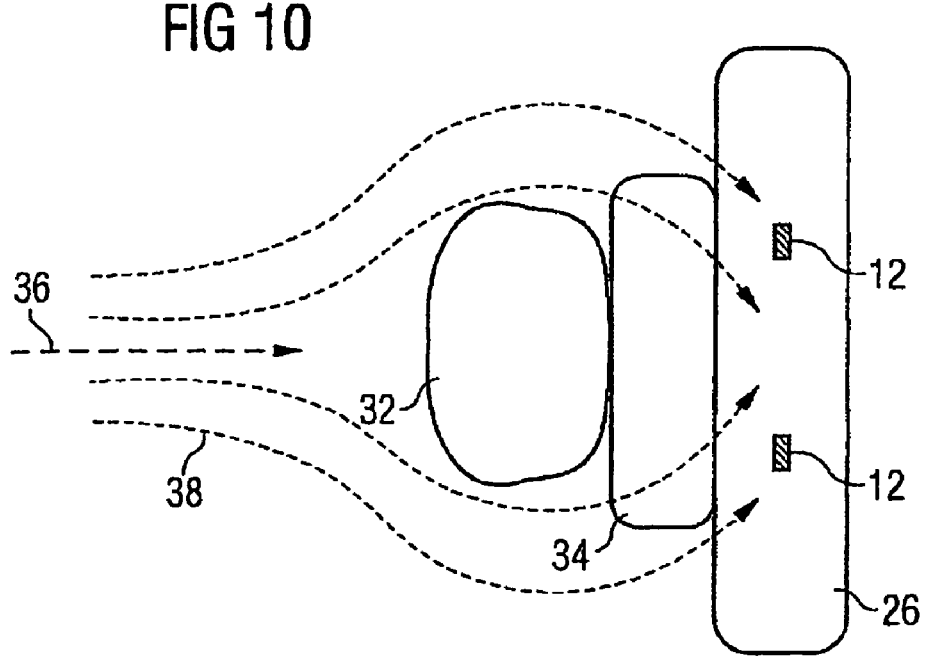
FIG. 10 top sectional view of the arrangement shown in FIG. 9.

FIG. 10 is a top sectional view of the arrangement shown in FIG. 9. The line of cut in FIG. 10 is made along the plane shown by an A in FIG. 9. Different ways are shown of how the microwave radiation can reach the reflectors 12 in the backrest of a seat 26 in which case the situation of a child 32 on a child seat 34 is taken as the starting point. On the one hand, there is the direct path 32 between the microwave transmitter device and the microwave receiver device 10 and the reflectors 12 which in said situation are obscured by the child 32. Because of the clearance between the child 32 and the reflectors 12 which is, in each case maintained by the child seat 34, it is however possible that microwaves for example by diffraction around the body and by reflection or scattering also often on indirect paths 38, arrive from the microwave transmitter device and the microwave receiver device 10 at the reflectors 12 and vice versa. This is only adversely affected negligibly by the child seat 34 because compared with the human body it has a much lower absorption capacity.

The principle of said invention was explained on the basis of the above description of the accompanying drawings by a system whereby reflectors, i.e. particularly backscatter devices, are arranged in a vehicle seat.

In this case, a microwave transmitter and a microwave receiver are required. The microwave transmitter transmits microwave radiation in the direction of the reflectors. The reflectors reflect the microwave radiation in the direction of the microwave receiver. Preferably, microwave transmitters and microwave receivers are implemented in the form of a microwave transmitter device and a microwave receiver device. However, the invention also refers to systems in which, instead of small-area receivers, small-area reflectors are arranged in a vehicle seat. In this case, a microwave transmitter which transmits microwave radiation in the direction of the receiver arranged in the seat is sufficient. Because of the tilting of a person on the seat, the advantageous intensity curves can likewise be reached in this way, particularly while the intensities of the single receiver arranged in the seat are summarized.

The invention can be summarized as follows. Disclosed is a system for detecting seat occupancy in a vehicle, comprising a microwave transmitter 10 and several reflectors 12 which are provided with a small area and which are arranged within a vehicle seat 20, especially within the backrest 26 of the vehicle seat 20. A greater or smaller number of reflectors 12 are enabled if a person 14 occupying the seat 20 leans forward, resulting in a jump in intensity each time an additional reflector 12 is enabled. Said jumps in intensity can be used in an advantageous manner for detecting the exact position of the person on the seat. In particular, an airbag can be prevented from deploying and the risks associated therewith can be avoided when the person 14 leans far forward (so-called out-of-position case). Alternatively, receivers can also be arranged within the seat 20 instead of reflectors 12.

The features of the invention disclosed in said description, on the drawings as well as in the claims, can be taken into consideration both individually and in any combination for implementing the invention.

We claim:

1. A system for detecting seat occupancy in a vehicle, comprising:
    at least one microwave transmitter; and
    a plurality of modulating backscatter reflectors disposed in a vehicle seat of the vehicle;
    wherein said at least one microwave transmitter and said reflectors are disposed and configured such that:

radiation transmitted by said microwave transmitter reaches said reflectors when the vehicle seat is not occupied;

radiation reflected from said reflectors is influenced in dependence on a seat occupancy; and said backscatter reflectors are distinguishable from one another by a modulation pattern modulated onto the reflected radiation.

2. The system according to claim 1, wherein said reflectors are arranged in at least one of a backrest of the vehicle seat and a headrest of the vehicle seat.

3. The system according to claim 1, wherein said backscatter reflectors are backscatter devices selected from the group consisting of passive devices, semipassive devices, semiactive devices, and active devices.

4. The system according to claim 1, wherein:
the seat occupancy influences an intensity of a received signal due to a diffraction of microwaves; and
the intensity of the received signal provides information about the seat occupancy.

5. The system according to claim 1, wherein said at least one microwave transmitter and said at least one microwave receiver together form a microwave transmitter/receiver device with a transmitter antenna and a receiver antenna.

6. The system according to claim 1, which comprises a control unit configured to selectively trigger, block, or enable functions in the vehicle depending on the reflected radiation.

7. The system according to claim 1, wherein said at least one microwave transmitter and/or said at least one microwave receiver form a part of an access control and start system of the vehicle.

8. The system according to claim 1, wherein the signals received by said microwave receiver are processed for evaluation with means used in an access control and start system installed in the vehicle.

9. The system according to claim 1, wherein said microwave transmitter and said reflectors are disposed to define a radiation path running in a straight line.

10. The system according to claim 1, wherein said microwave transmitter and said reflectors are disposed to define radiation paths running with diversions.

11. The system according to claim 1, wherein said reflectors are selectively activatable and deactivatable during specific time intervals, said reflectors are allocated given time intervals, and said reflectors are distinguished by the allocated time intervals.

12. The system according to claim 1, wherein said plurality of backscatter reflectors are modulated with a common frequency.

13. The system according to claim 1, wherein said plurality of backscatter reflectors are modulated with mutually different frequencies.

14. The system according to claim 1, further comprising at least one microwave receiver configured to receive the radiation reflected from said reflectors.

15. A method for determining a seat occupancy in a vehicle, which comprises:

transmitting microwave radiation towards a vehicle seat, and reaching the vehicle seat with the radiation at least in case the vehicle seat is unoccupied;

reflecting the microwave radiation at reflectors in the form of backscatter devices disposed in the vehicle seat, and influencing the reflected microwave radiation in dependence on the seat occupancy by modulating the radiation by a modulating backscatter process; and receiving the reflected microwave radiation and distinguishing the backscatter devices from one another by a modulation pattern modulated onto the reflected radiation.

16. The method according to claim 15, which comprises arranging the reflectors in at least one of a backrest of the vehicle seat and a headrest of the vehicle seat.

17. The method according to claim 15, which comprises providing backscatter devices selected from the group consisting of passive, semipassive, semiactive, and active backscatter devices.

18. The method according to claim 15, wherein the seat occupancy influences an intensity of a received signal due to a diffraction of microwaves; and the method comprises deducing information about the seat occupancy from the intensity of the received signal.

19. The method according to claim 15, which comprises further utilizing the received signal for triggering, blocking, or enabling functions in the vehicle.

20. The method according to claim 15, which comprises transmitting and/or receiving with an access control and start system installed in the vehicle.

21. The method according to claim 15, which comprises carrying out or supporting an evaluation of the received signals within a framework of an access control and start system installed in the vehicle.

22. The method according to claim 15, which comprises causing the radiation to follow a straight line radiation path.

23. The method according to claim 15, which comprises causing the radiation to follow diversion routes.

24. The method according to claim 15, which comprises:
selectively activating and deactivated the reflectors during specific time intervals; and
distinguishing the reflectors from one another by a time interval respectively allocated thereto.

25. The method according to claim 15, which comprises utilizing a common modulation frequency for backscatter processes occurring at the different reflectors.

26. The method according to claim 15, which comprises utilizing mutually different modulation frequencies for backscatter processes occurring at the different reflectors.

* * * * *